United States Patent

[11] 3,527,198

[72] Inventor Takashi Takaoka
 Kawasaki-shi, Japan
[21] Appl. No. 625,437
[22] Filed March 23, 1967
[45] Patented Sept. 8, 1970
[73] Assignee Tokyo Shibaura Electric Co., Ltd.
 Kawasaki-shi, Japan
 a corporation of Japan
[32] Priority March 26, 1966, April 12, 1966
[33] Japan
[31] 41/18,488; 41/22,684, 41/22,685 and 41/22,686

[54] METHOD AND APPARATUS FOR WORKING DIAMONDS BY MEANS OF LASER LIGHT BEAM
 4 Claims, 5 Drawing Figs.

[52] U.S. Cl. .................................. 125/30, 219/69, 219/121
[51] Int. Cl. .............................. B28d 5/00; B23k 9/16
[50] Field of Search ................................ 219/69, 121L; 125/30 (Inquired)

[56] References Cited
UNITED STATES PATENTS

| | | | |
|---|---|---|---|
| 2,258,480 | 10/1941 | Bergmann | 219/69X |
| 2,476,965 | 7/1949 | Emerson | 219/69X |
| 2,635,487 | 4/1953 | Potter | 219/69X |
| 3,293,652 | 12/1966 | Roshon | 219/69X |
| 2,931,351 | 4/1960 | Custers | 125/30 |
| 3,009,050 | 11/1961 | Steigerwald | 219/69 |

FOREIGN PATENTS

| 721,969 | 1/1955 | Great Britain | 219/ |
|---|---|---|---|

OTHER REFERENCES
Metalworking Production, Sept. 20, 1961 pp 65, 66, article "Twin Electrons drill 600 jewels an hour."

Primary Examiner—Harold D. Whitehead
Attorney—George B. Oujevolk

ABSTRACT: Method and apparatus for working diamonds wherein a diamond to be worked is disposed in a medium containing larger quantity of oxygen than air, and a concentrated laser light beam is projected upon the diamond.

Patented Sept. 8, 1970 3,527,198
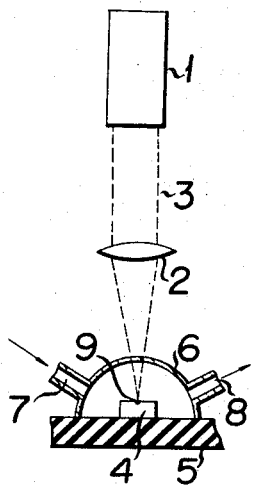
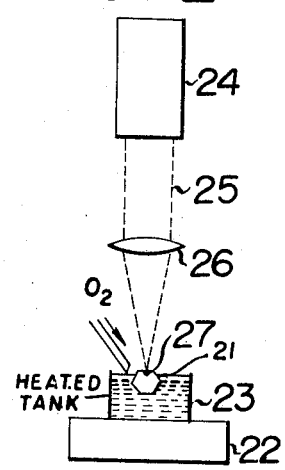
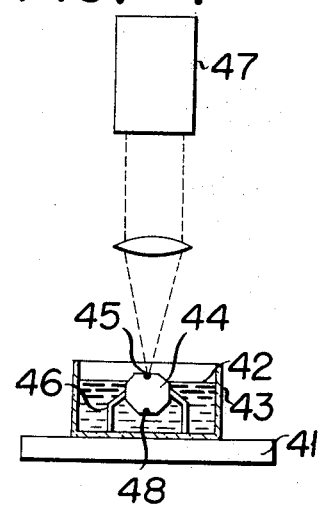
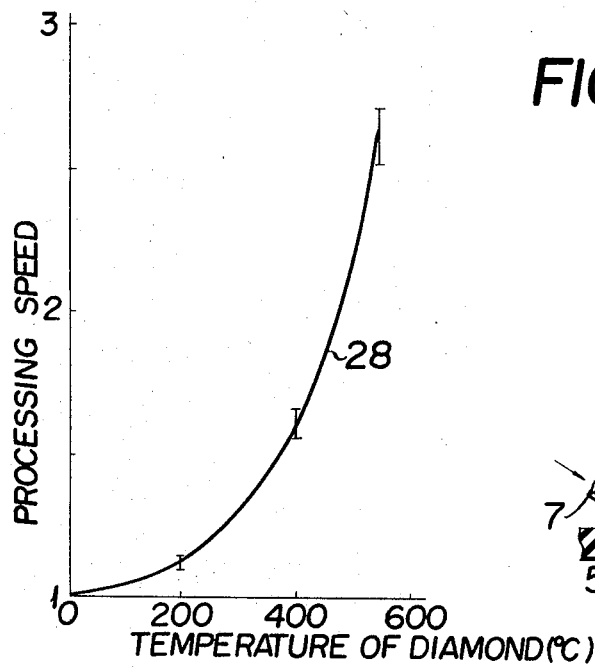
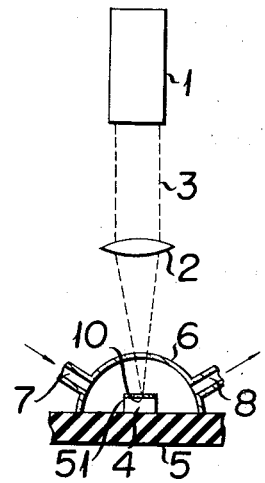
INVENTOR.
Takashi Takaoka
BY
George B. Oujevolk
Attorney

METHOD AND APPARATUS FOR WORKING DIAMONDS BY MEANS OF LASER LIGHT BEAM

This invention relates to a method and apparatus for working diamonds by means of a laser light beam.

In order to use diamonds as ultra hard tools or jewels it is necessary to work them by some appropriate means. Since no cutting tool or grinding and polishing material is presently available inter-rubbing technique is generally utilized. However such inter-rubbing working requires a very long time. Accordingly, a method and apparatus has been proposed for working diamonds wherein protions of diamonds to be worked are removed by burning in air by applying high energy of a concentrated beam of laser light. However this method has a defect in that there are produced blackened regions around the worked portions of the diamonds. Thus, bright spots on the diamonds created by the irradiation of concentrated laser light beam are brought to elevated temperatures and burn completely, but as the temperature at the periphery of the bright spots, or the points to be worked is elevated by reflected light or heat conduction the temperature of the periphery is lower than that of perfect combustion, thus resulting in incomplete combustion. As a result, graphite will be formed at portions of incomplete combustion, thus forming blackened regions. Especially where a plurality of portions of the diamond to be worked are closesly spaced opaque graphite formed in certain of said portions will precipitate on the adjoining surfaces which have already been worked thus hindering correct identification of the precise configuration of the diamond under working. Thus, this method is difficult to apply to precise working of diamonds.

Further, according to such conventional method of working portions of the diamond other than those to be worked, especially portions to the back of said portions to be worked are often damaged. Since portions of the diamonds which are worked are heated to an elevated temperature in a very short time by the heat of a concentrated irradiation of the laser light beam. As a result the grid vibration energy is heated to an elevated temperature in in an extremely short time so that the grid vibration energy becomes very large. This large grid vibration energy will be transmitted to the rear surface of the diamond opposite to the portion to be worked and is then dissipated into surrounding medium through the rear surface. However, it is believed that as the vibration impedances of this medium and of the diamond differ greatly, the vibration energy is not properly transmitted to the medium but is strongly reflected at the interface between the diamond and the gaseous medium thus creating a large transition at this interface. In order to preclude such rupturing phenomenon, no effective means has yet been proposed so that it was necessary to limit the intensity of the laser light beam to an extent not to destroy the rear surface of diamond, thus resulting in the decrease in the working speed.

Another problem of the prior method of working diamond is that it is necessary to vary the energy density of the laser light beam in order to obtain the same working speed during the initial working stage and subsequent working stages wherein the laser light beam is projected upon the surface of the diamond to be worked. At the initial stage of working it is necessary to use an extremely high energy density but once the point to be worked begins to burn the same working speed could be provided with far lower energy density than that of the initial stage. The reason is that because of a large transmission degree of diamond for the laser light beam, even when a bright spot is formed by projecting upon the surface to be worked a laser light beam of relatively low energy density, the quantity of energy absorbed by said surface is very small and the majority of the energy passes through the surface, so that the point to be worked in said surface would not be heated to the burning temperature.

However once the initial working is made the surface of diamond will be covered by a film of graphite produced by the incomplete combustion during said initial working so that the energy density required for subsequent working may be reduced to a fraction of the initial energy density since the graphite film serves to absorb energy.

An object of this invention is to provide a novel method and apparatus for working diamonds by irradiating them with a laser light beam in which the tendency of forming blackened regions around the portions to be worked can be reduced.

Another object of this invention is to provide a new and improved method and apaparatus for working diamonds by means of a laser light beam capable of increasing working speed and to minimize the tendency of forming blackened regions.

A further object of this invention is to provide a method of and apparatus for working diamonds by means of a laser light beam wherein at least a portion of the diamond other than portions to be worked is immersed in a liquid having a vibration impedance close to that of diamond so as to prevent damage on the rear side of the diamond opposite to said portion to be worked when it is irradiated with a concentrated beam of a laser light, and to increase the intensity of the laser light beam, thus increasing the working speed.

A still further object of this invention is to provide a novel method and apparatus for working diamonds by means of a laser light beam wherein a predetermined film is formed on the portion of the diamond to be worked approximating the energy density of the laser light beam at the initial stage of working and during subsequent working, so as to enable working without the necessity of varying the energy density in response to the illumination period of the laser light beam.

Briefly stated, in accordance with this invention there is provided an apparatus for working a diamond by means of a laser light beam comprising support means to support the diamond in a medium containing a larger quantity of oxygen than air and means to irradiate portions of said diamond supported in said medium by said support means with a concentrated beam of laser light.

Further objects and advantages of the present invention will become apparent and this invention will be better understood from the following description, reference being made to the accompanying drawing. The features of novelty which characterize the invention are set forth in the appended claims. In the drawings:

FIG. 1 is a diagrammatic representation of one embodiment of this invention;

FIG. 2 is a similar view of another embodiment of this invention;

FIG. 3 is a characteristic curve showing the relation between the temperature and the working speed of a diamond to be worked by the apparatus shown in FIG. 2; and FIGS. 4 and 5 are diagrammatic views of still another modifications of this invention.

Referring now to FIG. 1 of the accompanying drawing, there is shown in FIG. 1 a pulse laser device 1. Since in order to work by light energy it is generally preferable to use pulse formed light beam of high peak value rather than to use continuous light for rendering small the heat loss by conduction as well as the deterioration caused by the heating of the work piece it is advisable to use a pulsed laser device. A condenser lens 2 is provided to focus the laser light 3 to form a bright spot 9 of the desired diameter on the surface of a diamond 4 to be worked. The diamond 4 is mounted on a support 5 and is surrounded by a container 6 made of glass and the like transparent to the laser light. The container 6 is formed with a port 7 for admitting a gas containing a larger quantity of oxygen than air, such for example oxygen gas and an exit port 8.

As an example, the laser device 1 was constituted by a ruby laser device capable of producing an oscillatory light beam consisting of a plurality of spikes having a peak value of about 10 KW and a duration of about 0.5 ms. A convex lens having a focal length of 20 mm was used as the condenser lens. The laser device was repeatedly operated to form a hole of 200 $\mu$ diameter and 300 $\mu$ depth on the diamond 4. When the hole was formed while admitting nitrogen gas through the port 7, a strongly blackened region having a width of about 500 μ noted around the hole formed on the diamond, whereas a blackened region of 300 μ width was formed when air was admitted. However, when oxygen was used instead of said gases a light gray narrow annular ring was formed at a distance of the worked hole. Even when the surrounding container was eliminated and when the diamond was worked by directing a supply blast of oxygen onto the diamond 4, it was possible to prevent the blackened region from forming.

Thus, according to this embodiment it is possible to greatly reduce the tendency of blackening around the worked region of the diamond more than the conventional method of working carried out in the air.

Turning now to FIG. 2 illustrating another embodiment of this invention, a diamond 21 to be worked is mounted on a heater 23 in the form of a small electric heater, which, in turn, is supported by a support 22. The heater 23 is preferably in the form of a tank filled with a metal which is liquid at the desired temperature so as to immerse portions of the diamond other than those to be worked. This arrangement enables easy temperature control. There is provided a pulse laser device 24 capable of producing an oscillatory light beam consisting of a plurality of spikes having a peak value of about 10 KW and a duration of 0.5 ms. The laser light beam 5 emanated from this device 24 is focused by means of a condenser lens 26 having a focal length of 20 mm to produce a bright spot 27 on the surface to be worked of the diamond 21. When the device 24 was operated at a definite interval to generate a laser beam 25 of consant strength and when the support 22 was moved slightly in three dimensions a hole of 500 μ diameter and 50 μ depth was formed on the surface of the diamond 21. The time required for producing the hole of the dimensions mentioned above was determined for respective cases wherein the diamond 21 was maintained at room temperature, 200°C., 400°C. and 550°C., respectively. Curve 28 shown in FIG. 3 indicates the relation between the working time at respective temperatures and the ratio of the number of operations of the laser device at room temperature and the number of operations at respective temperatures or the working speed. As can be clearly noted from this curve, working speeds at 200°C., 400°C. and 550°C. were respectively 1.1 times, 1.6 times and 2.6 times larger than that at normal temperature.

With regard to the blackened region around the worked point, although at temperatures below 200°C. it was found that the blackened region was relatively large, at temperatures above 200°C., the blackened region became smaller and at temperatures above 400°C., only a small blackened region was noted.

Thus, in the second embodiment the diamond to be worked is heated by means of a suitable means to a temperature between 200°C. and the burning temperature thereof and the laser light beam is focused to a point of the diamond to be worked to burn and remove said point whereby the working speed of the diamond by a laser light beam of constant energy density is greatly increased and at the same time the tendency of forming the blackened region is minimized. Conversely, by increasing the temperature of heating necessary for obtaining the desired working speed the energy density at the bright spot or the focus could be reduced.

Still another embodiment of this invention will now be described by referring to FIG. 4. In this embodiment a vessel 43 filled with mercury 42 is mounted on a support 41 and a diamond 44 to be worked is supported by pedestals 46 to be immersed in the mercury except its point 45 to be worked. Above the diamond is disposed a ruby-pulse laser device having a peak output of about 100 KW. The light output from the laser device was focussed by means of a condenser lens having a focal length of 20 mm to form a focus of a diameter of approximately 200 μ on the surface of the diamond containing the point 45 to be worked, thus burning off the point. Then the laser device was repeatedly operated while the support 41 was moved in three dimensions to form a hole having a diameter of about 700 μ and a depth of about 300μ. Thereafter the condition of the rear surface portion 48 spaced from the worked point 45 by about 1.5 mm was observed and found that the portion was not damaged to any appreciable extent. In lieu of mercury 42 liquid of Ga-In eutectic alloy was used and a hole was drilled by the same method with the same satisfactory result. When performing the same operation by utilizing water instead of mercury 42 a small rupture was noted on the rear surface portion 48. On the other hand when the diamond 44 was worked with its entire surface surrounded by air it was found that the rear surface 48 was ruptured at several portions.

As the laser light source it is generally advisable to use a pulsed light source having a high peak value rather than a continuous light source because it is not only possible to decrease heat loss due to heat conduction but also to decrease deterioration of the diamond by heat. Further, as said liquid adapted to immerse the diamond it is advantageous to use a member selected from a group consisting of a metal which is liquid at the operating temperature, mercury for example, a eutectic alloy having a melting temperature lower than the operating temperature, Ga-In eutectic alloy, for example, and a substance having a vibration impedance closer to that of diamond rather than that of air or water. The term "operating temperature" as used herein means temperatures lower than the burning temperature of the diamond so that even a substance which is solid at room temperature but liquidifies upon heating to the operating temperature may well be used.

As described hereinabove according to this modification it is possible to increase the working speed by utilizing a laser light beam of high intensity because vibration energy is readily dissipated from the diamond without destroying portions thereof other than those to be worked.

FIG. 5 shows still another modification of this invention. According to this modification the surface of the diamond to be worked is covered with a coating of suitable thickness and made of a substance having a proper vapor pressure characteristic and a large laser beam absorbing ability. Thereafter the coating is irradiated with laser light beam to generate heat by absorbing it, thus reducing the energy density necessary for the initial working.

The material comprising the coating should have a larger laser light absorption coefficient than diamond and a vapor pressure lower than the atmospheric pressure at the burning temperature of the diamond, or approximately 700°C. Such a material may be selected from metals such as platium, molybdenum, or graphite or many other substances. The reason that the material should have a laser light adsorption constant larger than that of a diamond is to make easy generation of heat at the bright spot and hence to effect easier initial working by absorbing larger quantity of the energy of the laser light beam than a diamond. Further the reason for selecting a substance having a vapor pressure higher than the atmosphere at about 700°C. is to prevent vaporization of the coating on the periphery around the point of the diamond to be worked which is heated to an elevated temperature at the time of initial heating and to enable the initial working of portions other than the initially worked point without reforming the coating. By the same reason as before, as the laser beam source it is preferable to use a pulsed laser light source having a large peak amplitude rather than to use a continuous light source.

The operation of the embodiment shown in FIG. 5 is as follows. Since components identical to those of FIG. 1 are designated by the same reference numerals explanation thereof is believed unnecessary.

As the laser light source there was used a laser device 1 continuously producing a plurality of spikes of oscillating light having a peak value of about 10 KW and a duration of about 0.5 ms under normal operating condition and a condenser lens 2 having a focal length of about 20 mm was used as the condenser optical system to produce a focused bright spot on the surface of the diamond to be worked, thus drilling a hole. In case where the surface of the diamond is not covered with said coating it was necessary to increase the intensity of the oscillation of the laser device to at least more than 30 KW by increasing the pumping energy thereof at the time of inital working. In the subsequent working wherein the size of the hole drilled during the initial working is enlarged, even when the peak value was decreased to about 10 KW, it was possible to provide larger working ability than in the initial working.

However when the surface of the diamond was covered by a platinum film 51 by applying a solution of platinum on the diamond surface and then reducing by heat it was possible to perform the first working on a first position of said surface with the normal output condition of the laser light beam of about 10 KW peak, and thereafter continue the desired working without changing said output of 10 KW. Then another portion of said surface was similarly worked. But the platinum film 51 at that portion remained without being vaporized by the working of the first portion, it was possible to similarly work the other portion without reapplying the platinum coating 51.

Instead of the platinum film 51 a graphite film was formed by applying a solution of graphite on the surface of the diamond and then drying. The result of working was the same. In this case, the thickness of the graphite film substantially thicker than 50 $\mu$ should be avoided because such thick film may spatter at the time of working. Further a similar result was obtained when films were formed by properly treating a powder of molybdenum or the like.

It will be clear that these coatings may be deposited on the portions other than those to be worked and may be readily removed after working.

As stated hereinabove according to this invention it is possible to greatly decrease the energy density required for the initial working of the diamond. As a result the same and satisfactory working can be made not only during the initial working operation as well as the subsequent working operation, thus insuring ready and uniform working speed. Further, since such coatings will not evaporate off at the burning temperature of the diamond it is possible to work the second and following points coated with the coating immediately following the working of the first point.

The thickness of the coating on the surface of the diamond is preferably thin for the purpose of decreasing heat loss.

As a result as the substance for forming the coating, it is advantageous to use a substance which can be applied by brushing, spraying or dipping and then dried to form a metal film.

I claim:
1. An apparatus for working a diamond by means of a laser light beam comprising support means to support the diamond in the air, tank heating means to heat said diamond to a temperature of from about 200°C. to 700°C., said tank serving to hold metal which is liquid at the operating temperature, and as a liquid containing vessel for immersing the non-worked portions of the diamond, and radiating means to irradiate portions of said diamond to be worked with a concentrated beam of laser light.

2. The apparatus for working diamond by means of a laser light beam according to claim 1 wherein said diamond is supported by said support means under the condition where the additional oxygen is applied in the air.

3. An apparatus for working a diamond by means of a laser light beam comprising:
   a. support means to support the diamond in a medium containing a larger quantity of oxygen than air;
   b. tank heating means to heat said diamond to a temperature of from about 200°C. to the burning temperature of said diamond, said tank serving to hold a metal which is liquid at the operating temperature, the non-worked portions of the diamond being immersed therein; and
   c. radiating means to irradiate portions of said diamond to be worked with a concentrated beam of laser light.

4. A method of working a diamond by means of a laser light beam, comprising the steps of:
   a. immersing and supporting the not-to-be-worked portions of said diamond in a metal which is liquid at operating temperatures;
   b. applying to said diamond and its surroundings a medium containing a larger quantity of oxygen than air;
   c. heating said diamond to a temperature from about 200°C. to the burning temperature of said diamond; and
   d. irradiating portions of said diamond to be worked with a concentrated beam of laser light.